United States Patent [19]
Labauze

[11] Patent Number: 5,977,238
[45] Date of Patent: Nov. 2, 1999

[54] RUBBER COMPOSITION BASED ON CARBON BLACK HAVING SILICA FIXED TO ITS SURFACE AND ON DIENE POLYMER FUNCTIONALIZED WITH ALKOXYSILANE

[75] Inventor: Gérard Labauze, Clermont-Ferrand, France

[73] Assignee: Michelin & Cie, Clermont-Ferrand Cedex, France

[21] Appl. No.: 09/112,595

[22] Filed: Jul. 9, 1998

[30] Foreign Application Priority Data

Jul. 11, 1997 [FR] France .................................. 97 09048

[51] Int. Cl.$^6$ ...................................................... C08K 3/00
[52] U.S. Cl. ........................... 524/492; 524/493; 524/495; 524/496; 523/215
[58] Field of Search ..................... 524/492, 493, 524/495, 496; 523/215

[56] References Cited

U.S. PATENT DOCUMENTS 5,665,812   9/1997   Gorce et al. .

FOREIGN PATENT DOCUMENTS 0711805   5/1996   European Pat. Off. .

*Primary Examiner*—Edward J. Cain
*Attorney, Agent, or Firm*—Baker & Botts

[57] ABSTRACT

A rubber composition having improved hysteretic and physical properties which make it particularly suitable for forming a tire tread of reduced rolling resistance, comprising carbon black having silica fixed to its surface as the majority portion of reinforcing filler and at least one diene polymer functionalized by means of a functionalizing agent of general formula:

$$(Y)_m\text{—}R^1\text{—}Si(OR^2)_{3-n}R^3_n.$$

11 Claims, No Drawings

RUBBER COMPOSITION BASED ON CARBON BLACK HAVING SILICA FIXED TO ITS SURFACE AND ON DIENE POLYMER FUNCTIONALIZED WITH ALKOXYSILANE

BACKGROUND OF THE INVENTION

The present invention relates to a rubber composition for use particularly in the manufacture of tire treads, having improved hysteretic and physical properties in the vulcanized state, and comprising a diene polymer functionalized with alkoxysilane and carbon black having silica fixed to its surface as reinforcing filler.

Since savings in fuel and the necessity of environmental protection have become a priority, it is desirable to produce polymers having good mechanical properties and the lowest possible hysteresis, in order to be able to use them in the form of rubber compositions usable in the production of various semi-finished products which enter into the composition of tire treads, such as e.g. underlayers, binding gums between rubbers of various types or tire treads or sheathings of metallic or textile reinforcements, sidewall rubbers or tire treads, and to obtain tires of improved properties, and particularly a reduced rolling resistance.

To attain this objective, numerous solutions have been proposed consisting, in particular, in modifying the nature of diene polymers and copolymers at the end of polymerization by means of coupling agents, starring agents or functionalizing agents. Essentially, the great majority of these solutions have concentrated on the use of polymers modified with carbon black as reinforcing filler, with a view of obtaining a good interaction between the modified polymer and carbon black, inasmuch as the use of a white filler, notably silica, has proved inappropriate owing to the low value of some properties of such compositions and hence of certain characteristics of tires using these compositions, such as low abrasion resistance. As illustrative prior-art examples, reference may be made to U.S. Pat. No. 4,677,165, which describes the reaction of living polymers functionalized with benzophenone derivatives to obtain improved properties of carbon black-containing compositions. With the same objective, U.S. Pat. No. 4,647,625 describes the functionalization of polymers by reacting living polymers with N-methylpyrrolidine. Patent Applications EP-A-0 590 491 and EP-A-0 593 049 describe polymers containing amine functions, which permit a better interaction between polymer and carbon black.

A few solutions have also been proposed concerning the use of silica as reinforcing filler in compositions intended for the production of tire treads. Thus, Patent Applications EP-A-0 299 074 and EP-A-0 447 066 describe functionalized polymers comprising alkoxysilane functions. Only these functionalized polymers have been described in the prior art as being effective in reducing hysteresis and improving the abrasion resistance; nevertheless, the properties of these polymers remain inadequate to permit their use in compositions intended for making tire treads. Moreover, the formulation of these polymers poses problems due the development of macrostructures during elimination of the polymerization solvent, which leads to severe deterioration of properties of potential interest. Furthermore, this development cannot be well controlled.

Moreover, coupling reactions are frequently observed during such functionalization reactions, and, in order to minimize them, an excess of alkoxysilane and/or intense mixing are generally used.

This interest in silica-containing compositions has recently been demonstrated by the publication of Patent Application EP-A-0 501 227, which discloses a rubber composition vulcanizable with sulfur, obtained by thermo-mechanical working of a conjugated diene copolymer and a vinylaromatic compound, and using a precipitated silica of particularly high dispersibility. This composition, which represents an excellent compromise between several contradictory properties, permits the manufacture of tires having a tread filled with a special silica.

However, it is necessary, in silica-based compositions, to use relatively large amounts of linking agents to ensure that said compositions retain a good mechanical strength. These materials have very low electric conductivities, which, under certain special circumstances, do not always permit efficient grounding of accumulated static electricity, and which make it desirable to use a more complex method of tire production, using old solutions that are taken up in U.S. Pat. No. 5,518,055, EP-A-0 705 722 or EP-A-0 718 126 which describe the use of a conductive rubber strip traversing the tire tread; or in Patent Application EP-A-0 556 890, which deals with the addition of special conductive polymers to the rubber composition which constitutes the tire tread.

More recently, Patent Applications WO 96/37547 and EP-A-0 711 805 have described rubber compositions using, as reinforcing filler, carbon black having silica fixed to its surface, and which are based on functionalized or nonfunctionalized diene polymer and a silane coating agent and coupling agent. These compositions seem to have hysteretic properties that are improved in comparison to compositions containing carbon black as reinforcing filler. However, the silane coating agent and coupling agent must always be used in relatively large quantities.

Furthermore, Patent Application EP-A-0 711 805 discloses that improved hysteretic properties are obtained with a composition having a functionalized polymer known to improve the hysteretic properties with carbon black, a coupling agent and carbon black having silica fixed to its surface as reinforcing filler, in comparison to a composition using silica of low dispersibility as reinforcing filler; however, this publication does not present any data on the variation of other properties, and on the physical properties in particular.

SUMMARY OF THE INVENTION

It has been discovered, in a surprising manner, that vulcanized compositions comprising carbon black having silica fixed to its surface as reinforcing filler, and certain special diene polymers functionalized by means of alkoxysilanes, have rubber properties, particularly hysteretic and physical properties, that are improved with respect to compositions based on nonfunctional or functional diene polymers adapted to carbon black, properties that are at the same level as those of compositions based on functionalized or nonfunctionalized diene polymers containing a linking agent and silica as reinforcing filler, and that they also show a distinct increase in electrical conductivity as compared to the last-mentioned compositions.

The present invention relates to a vulcanizable rubber composition containing at least one functionalized diene polymer, carbon black having silica fixed to its surface as reinforcing filler, and other constituents that are common to such compositions, characterized in that the diene polymer is a diene polymer functionalized with a functionalizing agent having the general formula I:

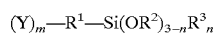

wherein

Y represents the groups

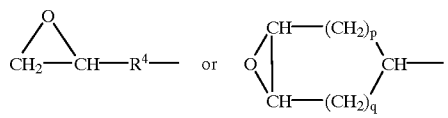

R¹ represents an alkyl, cycloalkyl or aryl group having 1 to 10 carbon atoms,

R² represents an alkyl, aryl, cycloalkyl, alkaryl or aralkyl group having 1 to 12 carbon atoms, R³ represents an alkyl, aryl or alkaryl group having 1 to 12 carbon atoms, R⁴ represents a hydrocarbon group having 1 to 6 carbon atoms and which may contain one or more oxygen groups in the hydrocarbon chain, n is an integer selected from 0 and 1, m is an integer selected from 1 or 2;

p and q are integers selected from among 0, 1, 2, 3 or 4, with the proviso that the sum p+q must represent a whole number between 2 and 5 inclusive.

Understood by the term "functionalized diene polymers" are all polymers that are entirely or substantially functionalized with a compound of general formula I, and which at the same time satisfy the following two ratios:

$$PF = \frac{Ns}{Np \times (fn)} \geq 0.85$$

and $$PV = \frac{Ne}{Ns \times m} \geq 0.90$$

wherein

Ns represents the number of moles of silicon linked to one end of the polymeric chain of the functionalized polymer, Np represents the number of moles of polymer before functionalization, f(n) represents the functionality of the polymerization initiator, Ne represents the number of moles of epoxy function linked to one end of the polymeric chain of the functionalized polymer, m has the meaning indicated above.

The number of moles of silicon and the number of moles of epoxy function present in the functionalized polymer may be determined by measurement with the aid of techniques known to persons skilled in the art, such as nuclear magnetic resonance (NMR), colorimetry, etc.

The number Np is obtained by the ratio of the molecular mass of the polymer to the number-averaged molecular mass of the polymer, the latter being determined by osmometry or tonometry.

Suitable among agents of general formula I are, preferably, 2-glycidyloxyethyltrimethoxysilane, 3-glycidyloxypropyltrimethoxysilane (GPTSI), 3-glycidyloxypropyltriethoxysilane, and 2-(3,4-epoxycyclohexyl)ethyltrimethoxysilane (ECETSI).

Understood by diene polymers suitable for use in the composition of the invention is any homopolymer obtained by polymerization of a conjugated diene monomer containing 4 to 12 carbon atoms, or any copolymer obtained by copolymerization of one or more conjugated dienes with each other or with one or more vinylaromatic compounds containing 8 to 20 carbon atoms. Suitable as conjugated dienes are, notably, butadiene-1,3,2-methyl-1,3-butadiene, the 2,3-di($C_1$- to $C_5$-alkyl)-1,3-butadienes such as 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, etc.

Suitable as vinylaromatic compounds are, notably, styrene, ortho-, meta- and paramethylstyrene, the commercial mixture "vinyltoluene," para-tert.-butylstyrene, the methoxystyrenes, vinylmesitylene, divinylbenzene, vinylnaphthalene, etc.

The copolymers may contain between 99% and 20% by weight of diene units and from 1% to 80% by weight of vinylaromatic units.

The functionalized diene polymers may have any microstructure, which is a function of the polymerization conditions used. The polymers may be block polymers, statistical polymers, sequenced polymers, microsequenced polymers, etc., and be prepared in dispersion or solution. In case of an anionic polymerization, the microstructure of these polymers may be determined by the presence or absence of a modifying and/or randomizing agent and by the quantities of modifying and/or randomizing agent used.

Suitable, by preference, are polybutadienes and, in particular, those having a 1,2-unit content of between 4% and 80%, polystyrenes, butadiene-styrene copolymers, and particularly those having a styrene content of between 4 and 50% by weight and more particularly between 20% and 40% by weight, a 1,2-bond content of the butadiene part of between 4% and 65%, a trans-1,4-bond content of between 30% and 80%, butadiene-isoprene copolymers and notably those having an isoprene content of between 5 and 90% by weight and a glass transition temperature ($T_g$) of −40° C. to −80° C., isoprene-styrene copolymers and notably those having a styrene content of between 5 and 50% by weight and a $T_g$ between −25° C. and −50° C. Suitable in the case of butadiene-styrene-isoprene copolymers are those having a styrene content of between 5 and 50% by weight and more particularly between 10% and 40% by weight, an isoprene content of between 15% and 60% by weight and more particularly between 20% and 50% by weight, a butadiene content of between 5 and 50% and more particularly between 20% and 40% by weight, a 1,2-unit content of the butadiene part of between 4% and 85%, a trans-1,4-unit content of the butadiene part of between 6% and 80%, a 1,2-plus 3,4-unit content of the isoprene part of between 5% and 70%, and a trans-1,4-unit content of the isoprene part of between 10% and 50%, and more generally, any butadiene-styrene-isoprene copolymer having a $T_g$ between −20° C. and −70° C.

As for polymerization initiators, any known anionic or non-anionic, mono- or polyfunctional initiator may be used. However, an initiator containing an alkali metal such as lithium or an alkaline earth metal such as barium is preferentially used. Suitable as organolithium initiators are, notably, those which have one or more carbon-lithium bonds. Representative compounds are aliphatic organolithium compounds such as ethyl lithium, n-butyl lithium (n-BuLi), isobutyl lithium, dilithium polymethylenes such as 1,4-dilithiobutane, etc. Lithium amides are also preferred initiators, as described in the patent FR-2 250 774. Representative barium-containing compounds are those described e.g. in Patent Applications FR-A-2 302 311 and FR-A-2 273 822, and in the certificates of addition FR-A-2 338 953 and FR-A-2 340 958, whose content is incorporated herein.

The method of preparation of such polymers functionalized with alkoxysilanes is presented in detail in the application EP-A-0 692 493, whose content is incorporated herein.

As stated in patent application EP-A-0 692 493 the alkoxysilane-functionalized diene polymers obtained in this manner have proved to be of particular interest for conferring properties that are improved in comparison with silica in compositions containing both silica and carbon black as reinforcing filler.

It has been surprisingly discovered that these same alkoxysilane-functionalized polymers make it possible to obtain improved hysteretic and physical properties in compositions containing, as reinforcing filler, carbon black having silica fixed to its surface in comparison to compositions containing carbon black as reinforcing filler, and to compositions comprising highly dispersible silica as reinforcing filler, with persons skilled in the art not ignoring the fact that this type of silica makes it possible to obtain a compromise of properties that are of much greater interest than can be obtained with nondispersible silicas. Moreover, it has been discovered that in the case of compositions using these alkoxysilane-functionalized polymers and carbon black having silica fixed to its surface, such improved properties were obtained even in the absence of coupling agent.

Said carbon black having silica fixed to its surface may be used in a blend with other reinforcing fillers such as carbon black or white fillers, notably silica, alumina, kaolin, and chalk. The relative percentage of these fillers may be adjusted on the basis of the property compromise of the compositions desired by persons skilled in the art.

The proportion of carbon black having silica fixed to its surface is at least equal to 30 parts by weight per 100 parts of polymer.

The proportion of silica present on the surface of the carbon black represents from 0.1 to 50% by weight, preferably from 0.3 to 30% by weight.

This carbon black having silica fixed to its surface may be obtained by different production methods. As an example, mention will be made of the production methods described in the patent EP-A-0 711 805, in Japanese patent No. 63-63755, or the production process of ECOBLACK CRX2000 marketed by CABOT Co. and described in patent WO096/37547.

Examples of silica suitable for use in the present invention are all precipitated or fumed silicas known to persons skilled in the art, and the highly dispersible silicas in particular. Understood by the term "highly dispersible silica" is any silica capable of a high degree of deagglomeration and dispersion in a polymer mold, observable by electron microscopy or optical microscopy on thin layers. The dispersibility of the silica is also assessed by means of a test of the ability for deagglomeration by ultrasound, followed by the measurement, by diffraction in a granulometer, of the particle size of silica, to determine the median diameter (D50) of the particles and the deagglomeration factor ($F_D$) after deagglomeration, as described in Patent Application EP-A-0 520 860, whose content is incorporated herein or in the article published in the periodical Rubber World, June 1994, pages 20–24, titled "Dispersibility Measurements of Prec. Silicas".

As nonlimitative examples of such silicas, mention may be made of the silica Perkasil KS 430 of AKZO Company, silicas Zeosil 1165 MP, 120 MP and 85 MP of Rhône-Poulenc, silica HI-Sil 2000 of PPG Co., silicas Zeopol 8741 or 8745 of Huber Co., and the aluminum "doped" silica described in Patent Application EP-A-0 735 088.

Suitable for use as carbon black are all carbon blacks that are commercially available or are conventionally used in tires, and particularly in tire treads. As non-limitative examples of such carbon blacks, mention may be made of carbon blacks N 234, N 339, N 326, N 375, etc.

In the composition according to the invention, the alkoxysilane-functionalized diene polymer may be used alone or in a blend with any other elastomer conventionally used in tires such as natural rubber or a blend based on natural rubber and a synthetic elastomer, or another diene polymer possibly coupled and/or starred or even partially or completely functionalized with a function other than the alkoxysilane function of general formula I. It is evident that the higher the proportion of conventional elastomer is in the composition according to the present invention, the less its properties will be improved. This is why a conventional elastomer may be present between 1 and 50 parts by weight per 100 parts of weight of alkoxysilane-functionalized polymer.

In addition to one or more diene polymers and the carbon black having silica fixed to its surface, the compositions according to the present invention contain all or some of the other constituents and additives conventionally used in rubber blends such as plasticizers, pigments, antioxidants, antiozonant waxes, a vulcanization system based either on sulfur and/or peroxide and/or bismaleinimides, vulcanization accelerators, expansion oils, or agents of linking with the elastomer and/or silica coating agents such as alkoxysilanes, polyols, amines, etc.

The present invention also relates to treads of tires and of tires of decreased rolling resistance.

DESCRIPTION OF PREFERRED EMBODIMENTS

The invention is illustrated by the following examples which are not intended to limit the scope of the invention.

In the examples, the properties of the compositions are evaluated as follows:

Mooney viscosity $ML_{1+4}$ (100° C.), measured according to ASTM Standard D-1646, and referred to as "Mooney" in the tables.

Elongation moduli at 300% (EM 300), 100% (EM 100) and 10% (EM 10): measurements carried out according to ISO 37.

Scott tear indices: measured at 20° C. (force at rupture in MPa, Fr, elongation at rupture in %, Er).

Hysteresis losses, measured at 60° C. in %. The deformation for the measured loss is 35%.

Shore A hardness: Measurements performed according to DIN 53505.

Dynamic properties in shear, measurements carried out as a function of deformation at 10 to 23° C., The nonlinearity ΔG expressed in MPa is the difference in shear modulus between 0.15% and 50% of the peak to peak deformation.

The hysteresis is expressed by measurement of the peak G" and the peak tan δ at 23° C. and about 7% deformation, noted as $G"_{max\ 23°\ C.}$ and tan $δ_{max\ 23°\ C.}$, respectively, according to ASTM D-2231-71 (reapproved in 1977).

The volume resistivity ($ρ_v$) is measured in ohm.cm according to ASTM D-257, its value being between $10^5$ and $10^{10}$ Ωcm. It will be expressed in the form of its log to the base 10, noted as Log resistivity.

EXAMPLE 1

The object of this example is to compare the properties of a composition based on an alkoxysilane-functionalized polymer with those of two other compositions based on the same polymers, but one of which is not functionalized and the other is functionalized with a known prior-art functionalizing agent, these three compositions containing, as reinforcing filler, carbon black having silica fixed to its surface.

In all tests of this example, the diene polymer is a butadiene-styrene copolymer having 40% 1,2-butadiene bonds, 25% styrene, a glass transition temperature $T_g$ of −38° C., and a Mooney viscosity of 60.

The butadiene-styrene copolymers used in the three compositions are for test A, an alkoxysilane-functionalized copolymer according to the invention, functionalized (SBR-A) for this purpose by means of a functionalizing agent consisting of glycidyloxypropyltrimethoxysilane, GPTSI;

for test B, a copolymer (SBR-B) functionalized with bis-diethylaminobenzophenone, DEAB, known to permit the obtainment of compositions having good hysteretic properties with carbon black;

for test C, a nonfunctionalized copolymer (SBR-C) stopped with methanol.

These SBR's were synthesized in a continuous process in toluene as polymerization solvent, and with butyl lithium as initiator. Thus, for all tests, the copolymer is prepared in a reactor of 32 liters useful capacity, with a turbine-type agitator, into which is continuously introduced toluene, butadiene, styrene and THF in a mass ratio of 100:10:4.3:0.3, and a solution of 500 micromoles of active n-BuLi per 100 grams of monomers. The flow rates of the different solutions are calculated so as to have a mean dwelling time of 45 minutes under vigorous agitation. The temperature is maintained constant at 60° C. At the exit from the reactor the conversion measured is 88%, and the SBR contains 25% incorporated styrene (by mass) and a content of 40% 1,2-bonds for the butadiene part.

To obtain SBR-A, the functionalizing agent glycidyloxypropyltrimethoxysilane (GPTSI) is added to the living polymer either at the inlet of a conventional static mixer (SM) comprising 26 elements and a volume of 250 mL, or at the inlet of a dynamic mixer (DM) of 250 mL equipped with a stirrer adjusted to a rotational speed of 2500 rpm. The GPTSI is introduced at a GPTSI/active n-BuLi ratio of 2. The functionalization reaction is carried out at 60° C.

Within the framework of the synthesis of SBR-B, the bis-diethylaminobenzophenone DEAB instead of GPTSI is added at a DEAB/active n-BuLi ratio of 1.5. To obtain SBR-C, the DEAB is replaced with methanol at a MeOH/active n-BuLi ratio of 1.5.

In the three cases there are added, after 5 minutes, 0.8 part of 2,2'-methylene-bis(4-methyl-6-tert.-butylphenol) per 100 parts of elastomer and 0.2of N-(1,3-dimethylbutyl)-N'-phenyl-p-phenylenediamine as antioxidants. The polymers are recovered in a conventional recovery operation by steam distilling the solvent and then drying the polymers on a cylindrical tool at 100° C. for 10 minutes.

The proportion of epoxy function and silicon atoms is measured by proton NMR, as described in Patent Application EP-A-0 692 493. By this measurement it can be established that the functionalized polymer SBR-A contains 5.3 millimoles of $SiCH_2$ units and 4.9 millimoles of epoxy units per kg of polymer. The molecular mass obtained by osmometry of the polymer is 170,000 g/mole. These values make it possible to obtain the PF and PV ratios, which are PF=0.90 and PV=0.92, respectively.

For the functionalized polymer SBR-B, the number of millimoles of the

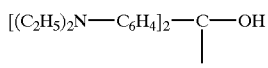

unit determined by proton NMR is 4.7 per kg of polymer, which corresponds to a function content of 82%, the molecular mass being 175,000 g/mole.

By means of the three copolymers SBR-A, B and C, there are prepared, in a way known per se, three rubber compositions A1, B1 and C1 reinforced with carbon black having silica fixed to its surface, according to the following formulation, where all parts are expressed by weight:

Elastomer: 100
Silica-treated carbon black (*): 60
Aromatic oil: 25
Linking agent (**): 1.8
Zinc oxide: 2.5
Stearic acid: 1.5
Antioxidant (a): 1.9
Paraffin (b): 1.5
Sulfur: 1.1
Sulfenamide (c): 2
Diphenylguanidine: 0.42

(*) The carbon black having silica fixed to its surface is a carbon black marketed by the CABOT Co. under the name NOIR ECOBLACK CRX2000 (% Si: 2.74 without HF treatment, 0.33% after HD treatment; specific surface area (N2): 138.9 $m^2/g$ without HF treatment, 179.6 $m^2/g$ after HF treatment).
(**) Polysulfurated organosilane marketed by Degussa Co. under the name SI69.
(a): Antioxidant: N-(1,3-dimethylbutyl)-N'-phenyl-p-phenylenediamine.
(b): Paraffin: Mixture of macro- and microcrystalline waxes.
(c): Sulfenamide: N-Cyclohexyl-2-benzothiazyl sulfenamide The three copolymers described above are used in a composition produced by the method described in Patent Application EP-A-0 501 227, incorporated in the present application, it being specified that a thermomechanical operation consisting of two stages is carried out, which last 5 minutes and 4 minutes respectively, at a mean paddle speed of 45 rpm until attaining an identical maximum drop temperature of 160° C., while the vulcanization system is introduced at 30° C. on a cylindrical tool.

The vulcanization is carried out at 150° C. for 50 minutes. The properties of these 3 compositions are compared with one another in both the nonvulcanized and vulcanized state.

The results are shown in Table 1.

TABLE 1

| Composition | A1 | B1 | C1 |
|---|---|---|---|
| Stopper | GPTSI | DEAB | MeOH |
| Properties in the nonvulcanized state: | | | |
| $ML_{1+4}$ (100°) | 100 | 87.5 | 75.5 |
| Properties in the vulcanized state: | | | |
| Log resistivity | 8.38 | 8.14 | 7.98 |
| Shore | 59.5 | 58.8 | 59.7 |
| EM10 | 4.21 | 4.15 | 4.14 |
| EM100 | 1.73 | 1.56 | 1.56 |
| EM300 | 2.72 | 2.32 | 2.32 |
| EM300/EM100 | 1.57 | 1.49 | 1.49 |
| Scott | | | |
| 20° C. Fr | 20.6 | 23.7 | 21.2 |
| 20° C. Ar % | 485 | 585 | 530 |
| PH 60° C. | 23.4 | 24.4 | 26.1 |

TABLE 1-continued

| Composition | A1 | B1 | C1 |
|---|---|---|---|
| Dynamic properties as a function of deformation | | | |
| $\Delta G_{at\ 23°}$ | 1.43 | 2.29 | 2.60 |
| $G''_{max\ 23°\ C.}$ | 0.45 | 0.70 | 0.83 |
| $\tan \delta_{max\ 23°\ C.}$ | 0.25 | 0.29 | 0.33 |

It is noted with regard to the properties in the vulcanized state that the composition A1 based on SBR-A (GPTSI functionalization) shows hysteretic properties that are markedly better than those of composition C1 containing SBR-C (stopped with methanol) at low ($G''_{max\ 23°}$; $\tan \delta_{max\ 23°}$ C.) and high (PH 60° C.) deformation, but also better than those obtained with composition B1 (DEAB functionalized SBR-B), without any deterioration of the other properties.

EXAMPLE 2

The object of this example is to compare the rubber composition A1 according to the invention (containing a GPTSI-functionalized polymer and carbon black having silica fixed to its surface) with a composition B2 containing SBR-B functionalized with DEAB and a filler consisting of carbon black, on the one hand, and a composition C2 containing SBR-C, a filler consisting of silica and a silane coupling agent, on the other. These last two compositions, B2 and C2, are known to give good hysteretic properties with carbon black and silica.

The production method used is the same as that described in Example 1 for composition C1.

These compositions have the following formulations:

| Composition B2 | | Composition C2 | |
|---|---|---|---|
| Elastomer: | 100 | Elastomer: | 100 |
| Carbon black N234 | 60 | Silica (*) | 60 |
| Aromatic oil: | 25 | Aromatic oil: | 25 |
| | | Linking agent (**): | 4.8 |
| Zinc oxide: | 3 | Zinc oxide: | 2.5 |
| Stearic acid: | 2 | Stearic acid: | 1.5 |
| Antioxidant (a): | 1.9 | Antioxidant (a): | 1.9 |
| Paraffin (b): | 1.5 | Paraffin (b): | 1.5 |
| Sulfur: | 1.2 | Sulfur: | 1.1 |
| Sulfenamide (c): | 1.2 | Sulfenamide (c): | 2 |
| | | Diphenylguanidine: | 1.5 |

(*) Silica: ZEOSIL 1165, marketed by Rhône-Poulenc
(**) Polysulfurated organosilane, sold by Degussa Co. under the name SI69.

The results are shown in Table 2.

TABLE 2

| Composition | A1 | B2 | C2 |
|---|---|---|---|
| Stopper | GPTSI | DEAB | MeOH |
| Filler | Silica-treated carbon black | Black | Silica |
| Properties in the nonvulcanized state: | | | |
| $ML_{1+4}$ (100°) | 100 | 90 | 68.5 |
| Properties in the vulcanized state: | | | |
| Log resistivity | 8.38 | 5.3 | >10 |
| Shore | 59.5 | 60 | 58.4 |
| EM10 | 4.21 | 4.44 | 4.16 |
| EM100 | 1.73 | 1.51 | 1.37 |
| EM300 | 2.72 | 2.02 | 1.53 |
| EM300/EM100 | 1.57 | 1.34 | 1.12 |

TABLE 2-continued

| Composition | A1 | B2 | C2 |
|---|---|---|---|
| Scott | | | |
| 20° C. Fr | 20.6 | 22.7 | 23.0 |
| 20° C. Ar % | 485 | 650 | 705 |
| PH 60° C. | 23.4 | 30 | 26.1 |
| Dynamic properties as a function of deformation | | | |
| $\Delta G_{at\ 23°}$ | 1.43 | 4.84 | 1.88 |
| $G''_{max\ 23°\ C.}$ | 0.45 | 1.25 | 0.58 |
| $\tan \delta_{max\ 23°\ C.}$ | 0.25 | 0.36 | 0.25 |

It is noted that composition A1 (with GPTSI-functionalized SBR-A) comprising the carbon black ECO-BLACK CRX2000 shows a very strong decrease of hysteresis (at low and high deformation) of the order of 30% relative to that obtained for composition B2 based on carbon black, without any deterioration of the other properties.

Moreover, it is noted that composition A1 has hysteresis characteristics that are improved even in comparison to the silica-based composition C2, with a highly reduced conductivity level.

EXAMPLE 3

Compared in this example are three compositions A3, C3 and B3, based respectively on SBR-A (functionalized with GPTSI), SBR-C (stopped with MeOH) and SBR-B (functionalized with DEAB) containing no linking agent but carbon black having silica fixed to its surface as reinforcing filler.

Compositions A3, C3 and B3 are prepared by the method presented in Example 1, and have the following formulation:

Elastomer: 100
Silica-treated carbon black (*): 60
Aromatic oil: 25
Linking agent: 0
Zinc oxide: 2.5
Stearic acid: 1.5
Antioxidant (a): 1.9
Paraffin (b): 1.5
Sulfur: 1.1
Sulfenamide (c): 2
Diphenylguanidine: 0.42

(*) The carbon black having silica fixed to its surface is a carbon black marketed by CABOT Co. under the name NOIR ECOBLACK CRX2000 (% Si: 2.74 without HF treatment, 0.33% after HF treatment; specific surface area (N2): 138.9 m²/g without HF treatment, 179.6 m²/g after HF treatment).

The results are compiled in Table 3.

TABLE 3

| Composition | A3 | B3 | C3 |
|---|---|---|---|
| Stopper | GPTSI | DEAB | MeOH |
| Properties in the nonvulcanized state: | | | |
| $ML_{1+4}$ (100°) | 103 | 91.5 | 76.5 |
| Properties in the vulcanized state: | | | |
| Log resistivity | 7.61 | 7.09 | 6.79 |
| Shore | 55.3 | 57.3 | 58.1 |
| EM10 | 3.66 | 4.13 | 4.35 |
| EM100 | 1.33 | 1.32 | 1.30 |
| EM300 | 1.88 | 1.65 | 1.61 |
| EM300/EM100 | 1.41 | 1.25 | 1.24 |

TABLE 3-continued

| Composition | A3 | B3 | C3 |
|---|---|---|---|
| Scott | | | |
| 20° C. Fr | 21.8 | 21.9 | 20.8 |
| 20° C. Ar % | 620 | 670 | 685 |
| PH 60° C. | 27.2 | 28.8 | 33.4 |
| Dynamic properties as a function of deformation | | | |
| $\Delta G_{at\ 23°\ C.}$ | 1.49 | 3.03 | 3.83 |
| $G''_{max\ 23°\ C.}$ | 0.54 | 0.78 | 0.97 |
| $\tan \delta_{max\ 23°\ C.}$ | 0.26 | 0.38 | 0.38 |

It is noted that even without the use of linking agent, composition A3 using (GPTSI-functionalized) SBR-A has a hysteresis level at low ($G'_{max\ 23°}$ C.; $\tan \delta_{max\ 23°}$) and high (PH 60° C.) deformation that is very low in comparison to the other two compositions which also contain carbon black having silica fixed to its surface as reinforcing agent, without any deterioration of the other properties.

Moreover, a very slight deterioration is noted of the hysteresis characteristics of compositions B3 and C3 based respectively on SBR-B and SBR-C in comparison to compositions B2 and C2 of Example 2 which are based on the same polymers but containing a coating agent and linking agent, whereas, on the contrary, the hysteresis characteristics of composition A3 are close to those of composition A1 containing a linking agent.

It should also be stressed that the other properties of mechanical cohesion (MA300 force and elongation at rupture) of composition A3 are not reduced in comparison to composition A1, nor is there a decrease in the level of conductivity.

EXAMPLE 4

The object of this example is to compare composition A1 according to the invention to two other compositions D1 and E1 based on commercial SBRs.

Compositions D1 and E1 are prepared on the basis of the following commercial SBRs, respectively:

T0589, manufactured by JAPAN SYNTHETIC RUBBER CO., which is a polymer specifically modified to react with silica, and which has the following characteristics: $T_g$=-32° C., % 1,2=41%, % sty=33%, $ML_{1+4}(100°)$=45.

NS116, manufactured by NIPPON ZEON Co., which is a polymer specifically modified to react with carbon black, and which has the following characteristics: $T_g$=-25° C., % 1,2=60%, % sty=21%, $ML_{1+4}(100°)$=50.

The three compositions A1, D1 and E1 have the same formulation as that specified in Example 1 based on carbon black having silica fixed to its surface (ECOBLACK CRX2000), and the method of preparation of these compositions is also identical to that used for composition A1 of Example 1.

The results are compiled in Table 4.

TABLE 4

| Composition | A1 | D1 | E1 |
|---|---|---|---|
| Stopper | SBR-A | T0589 | NS116 |
| Properties in the nonvulcanized state: | | | |
| $ML_{1+4}$ (100°) | 100 | 56 | 48 |

TABLE 4-continued

| Composition | A1 | D1 | E1 |
|---|---|---|---|
| Properties in the vulcanized state: | | | |
| Log resistivity | 8.38 | 7.84 | 7.48 |
| Shore | 59.5 | 58.6 | 59.8 |
| EM10 | 4.21 | 4.39 | 4.47 |
| EM100 | 1.73 | 1.72 | 1.70 |
| EM300 | 2.72 | 2.60 | 2.49 |
| EM300/EM100 | 1.57 | 1.51 | 1.46 |
| Scott | | | |
| 20° C. Fr | 20.6 | 23.3 | 20.8 |
| 20° C. Ar % | 485 | 535 | 515 |
| PH 60° C. | 23.4 | 29.0 | 29.1 |
| Dynamic properties as a function of deformation | | | |
| $\Delta G_{at\ 23°}$ | 1.43 | 2.47 | 2.60 |
| $G''_{max\ 23°\ C.}$ | 0.45 | 0.0951 | 0.977 |
| $\tan \delta_{max\ 23°\ C.}$ | 0.25 | 0.341 | 0.364 |

In the light of its properties in the vulcanized state, it is noted that composition A1 based on a SBR-A according to the invention makes it possible to obtain very low hysteresis properties and very high reinforcement characteristics in comparison to the two compositions D1 and E1.

It thus appears that the use of just any functionalized polymer adapted to carbon black does not make it possible to obtain an improvement of the hysteretic and physical properties during its use in a composition based on silica-treated carbon black (in this case ECOBLACK CRX2000), nor are the properties improved upon transposition of just any polymer specifically functionalized for silica to a composition comprising silica-treated carbon black as reinforcing filler.

I claim:

1. A vulcanizable rubber composition comprising at least one functionalized diene polymer and carbon black having silica fixed to its surface as reinforcing filler, characterized in that the diene polymer is a diene polymer functionalized by means of a functionalizing agent of general formula I:

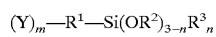

wherein

Y represents the groups

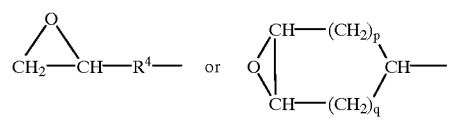

$R^1$ represents an alkyl, cycloalkyl or aryl group containing 1 to 10 carbon atoms, $R^2$ represents an alkyl, aryl, cycloalkyl, alkaryl or aralkyl group containing 1 to 12 carbon atoms, $R^3$ represents an alkyl, aryl or alkaryl group containing 1 to 12 carbon atoms, $R^4$ represents a hydrocarbon group containing 1 to 6 carbon atoms and which may contain one or more oxygen atoms in the hydrocarbon chain, n is an integer selected from among 0 and 1, m is an integer selected from among 1 or 2, p and q are integers selected from among 0, 1, 2, 3 or 4, with the proviso that the sum p+q must represent an integer between 2 and 5 inclusive, said polymer simultaneously satisfying the two ratios $$PF = \frac{Ns}{Np \times (fn)} \geq 0.85$$

and $$PV = \frac{Ne}{Ns \times m} \geq 0.90$$

wherein

Ns represents the number of moles of silicon linked to one end of the polymer chain of the functionalized polymer, Np represents the number of moles of polymer before functionalization, f(n) represents the functionality of the polymerization initiator, Ne represents the number of moles of epoxy function linked to one end of the polymer chain of the functionalized polymer, and m has the same meaning as above.

2. A composition according to claim 1, characterized in that the functionalized polymer contains 80% to 100% of functionalized chains.

3. A composition according to claim 1, characterized in that the functionalizing agent is selected from the group consisting of 3-glycidyl-oxypropyltrimethoxysilane and 2-(3,4-epoxycyclohexyl)-ethyltrimethoxysilane.

4. A composition according to claim 1, characterized in that the functionalized diene polymer is selected from the group consisting of polybutadiene, a butadiene-styrene copolymer or a butadiene-styrene-isoprene copolymer.

5. A composition according to claim 4, characterized in that it comprises from 1 to 70 parts by weight of at least one other diene elastomer selected from the group consisting of natural rubber, polybutadiene, polyisoprene, butadiene-styrene and butadiene-styrene-isoprene.

6. A composition according to claim 1, characterized in that the amount of silica present on the surface of the carbon black represents 0.1 to 50% by weight.

7. A composition according to claim 6, characterized in that the amount of silica present on the surface of the carbon black represents 0.3 to 30% by weight.

8. A composition according to claim 1, characterized in that the carbon black having silica fixed to its surface is used in a blend with other reinforcing fillers.

9. A tire having a composition of vulcanized rubber comprising at least one functionalized diene polymer, and carbon black having silica fixed to its surface as reinforcing filler, characterized in that the diene polymer is a diene polymer functionalized by means of a functionalizing agent of general formula I:

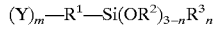

wherein

Y represents the groups

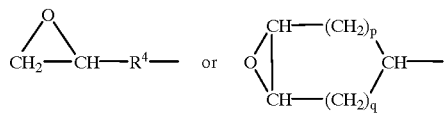

$R^1$ represents an alkyl, cycloalkyl or aryl group containing 1 to 10 carbon atoms, $R^2$ represents an alkyl, aryl, cycloalkyl, alkaryl or aralkyl group containing 1 to 12 carbon atoms, $R^3$ represents an alkyl, aryl or alkaryl group containing 1 to 12 carbon atoms, $R^4$ represents a hydrocarbon group containing 1 to 6 carbon atoms and which may contain one or more oxygen atoms in the hydrocarbon chain, n is an integer selected from among 0 and 1, m is an integer selected from among 1 or 2, p and q are integers selected from among 0, 1, 2, 3 or 4, with the proviso that the sum p+q must represent an integer between 2 and 5 inclusive, said polymer simultaneously satisfying the two ratios $$PF = \frac{Ns}{Np \times (fn)} \geq 0.85$$

and $$PV = \frac{Ne}{Ns \times m} \geq 0.90$$

wherein

Ns represents the number of moles of silicon linked to one end of the polymer chain of the functionalized polymer, Np represents the number of moles of polymer before functionalization, f(n) represents the functionality of the polymerization initiator, Ne represents the number of moles of epoxy function linked to one end of the polymer chain of the functionalized polymer, and m has the same meaning as above.

10. A tire according to claim 9, characterized in that said composition enters into the constitution of the tire tread.

11. A tire tread composed of a vulcanized rubber composition comprising at least one functionalized diene polymer and carbon black having silica fixed to its surface, characterized in that the diene polymer is a diene polymer functionalized with a functionalizing agent of general formula I

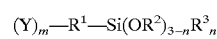

wherein

Y represents the groups

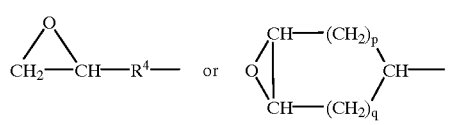

$R^1$ represents an alkyl, cycloalkyl or aryl group containing 1 to 10 carbon atoms, $R^2$ represents an alkyl, aryl, cycloalkyl, alkaryl or aralkyl group containing 1 to 12 carbon atoms, $R^3$ represents an alkyl, aryl or alkaryl group containing 1 to 12 carbon atoms, $R^4$ represents a hydrocarbon group containing 1 to 6 carbon atoms and which may contain one or more oxygen atoms in the hydrocarbon chain, n is an integer selected from among 0 and 1, m is an integer selected from among 1 or 2, p and q are integers selected from among 0, 1, 2, 3 or 4, with the proviso that the sum p+q must represent an integer between 2 and 5 inclusive, said polymer simultaneously satisfying the two ratios $$PF = \frac{Ns}{Np \times (fn)} \geq 0.85$$

and $$PV = \frac{Ne}{Ns \times m} \geq 0.90$$

wherein

Ns represents the number of moles of silicon linked to one end of the polymer chain of the functionalized polymer, Np represents the number of moles of polymer before functionalization, f(n) represents the functionality of the polymerization initiator, Ne represents the number of moles of epoxy function linked to one end of the polymer chain of the functionalized polymer, and m has the same meaning as above.

* * * * *